Oct. 17, 1967  A. F. WOOD  3,348,018

RESISTANCE WELDING ASSEMBLY

Filed July 13, 1964  4 Sheets-Sheet 1

INVENTOR
ARTHUR F. WOOD
BY
ATTORNEY

Oct. 17, 1967 A. F. WOOD 3,348,018
RESISTANCE WELDING ASSEMBLY
Filed July 13, 1964 4 Sheets-Sheet 4

INVENTOR
ARTHUR F. WOOD
BY
ATTORNEY

United States Patent Office

3,348,018
Patented Oct. 17, 1967

3,348,018
RESISTANCE WELDING ASSEMBLY
Arthur F. Wood, Indianapolis, Ind., assignor to P. R.
Mallory & Co., Inc., Indianapolis, Ind., a corporation
of Delaware
Filed July 13, 1964, Ser. No. 382,094
12 Claims. (Cl. 219—119)

ABSTRACT OF THE DISCLOSURE

The welding assembly for microwelding including concentric first and second electrodes. The weld faces of the first and second electrodes are formed by passing a plane through the longitudinal axis of each of the electrodes such that the spacing between the weld faces is varied by rotating the first electrode about its longitudinal axis.

---

The present invention pertains to electrical resistance welding and more particularly to an apparatus for resistance welding of microcomponents such as electronic modules and the like.

Microwelding demands that an element no larger than the size of a pin head be welded to a thin sheet workpiece accurately and efficiently without introducing a weld weakening blemish into the weld and without effecting surrounding circuitry of the electronic module.

In the past, when it was required that particularly delicate welding of close tolerance be done by utilizing two electrodes of which one is electrically a first polarity and the other is electrically a second polarity. Generally, the two electrodes are positioned so that the axis of one of the electrodes is at an angle with the axis of the other electrode. The electrodes are positioned in angular contact with a thin metal wire or strip and an underlying metal film, strip or wire to which it is desired to weld the wire. The localized welding required is done primarily by the heat obtained from the resistance to the flow of electrical current through the contacting portions of the wire or strip and the metallic film, strip, or wire. The heat so generated between the contact point between the wire and the metallic film forms a bond between the wire and the metallic film at the point of contact. Since each of the two electrodes requires a positioning and retaining means, it is left to the skill of the individual operator to locate and thereafter correctly position the electrodes on the electronic module. This procedure is not only time consuming, but in addition fosters non-uniformity in results due to the variations in techniques of individual operators. For exacting welding requiring close tolerances in placement of the weld, special methods of aligning the electrodes at an angle with the materials to be worked upon and special aligning tools must be utilized. It is seen that this procedure is time consuming and does not produce the uniform results necessary in precision microwelding. When the electrodes are located, one electrode positioned on the wire or strip and one electrode positioned on the metallic film, strip, or wire, the operator may experience skidding of the electrodes across the electronic module because the angle between the axis of the electrodes and the angle between the individual electrodes on the electronic module is not proper. The skidding of the electrodes may cause arcing at locations on the module across which the electrodes have skidded causing flaws in the module which may prohibit proper operation of the module. The present invention provides a novel pair of concentric electrodes which eliminate the placement of the axis of the two electrodes at an angle each with the other by the individual operator. The present invention would substantially eliminate the present problem of skidding of the electrodes across the module.

It is seen that the special aligning tools required in aligning the electrodes would also be eliminated as would the variations in welds due to the variations in the techniques of electrode alignment utilized by the individual operators.

Therefore, it is an object of the present invention to provide a means and method of welding microcomponents by utilizing rotatable concentric electrodes.

Still another object of the present invention is to provide electrodes which may be used to weld extremely thin materials without burning or causing blemishes in the material.

Another object of the present invention is to provide a concentric electrode device which is practicable and inexpensive to construct.

Yet another object of the present invention is to provide a welding device that has substantially no degration of heat-sensitive components during the welding.

Still another object of the present invention is to provide a resistance welder adaptor that has provisions for substantially automatic alignment with the workpiece.

A further object of the present invention is to provide concentric electrodes that have faces that are axially positionable with respect to each other.

Another object of the present invention is to provide a simple, efficient, and practical microwelding assembly.

Still another object of the present invention is to provide a microwelding apparatus utilizing electrodes applying controlled pressure to a thin workpiece such that sufficient current flow is utilized to produce the desired weld without damaging the thin workpiece.

Yet another object of the present invention is to provide an electrode holder that retains both electrodes in such a manner that the center of the face of one of the electrodes is adjustable with respect to the center of the face of the other electrode.

Another object of the present invention is to provide a microwelder having optimum reliability characteristics afforded by compact construction having a minimum number of parts.

A further object of the present invention is to provide means for low cost, individually replaceable electrodes.

The present invention in another of its aspects relates to novel features of the instrumentalities of the invention described herein for teaching the principal object of the invention and to the novel principles employed in the instrumentalities whether or not these features and principles may be used in the said object and/or in the said field.

With the aforementioned objects enumerated other objects will be apparent to those persons possessing ordinary skill in the art. Other objects will appear in the following description, appended claims, and appended drawings. The invention resides in the novel construction, combination, arrangement, and cooperation of elements as hereinafter described and more particularly as defined in the appended claims. The appended drawings illustrate several novel and different embodiments of the present invention, constructed to function in the most advantageous modes devised for the practical application of the basic principles involved in the hereinafter described invention.

Figure 1:
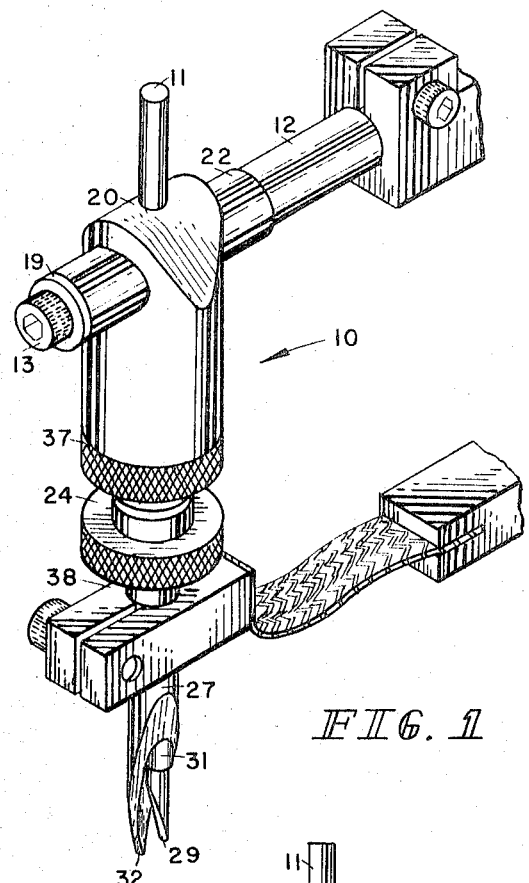
FIGURE 1 is an enlarged perspective view of an embodiment of the present invention illustrating the concentric microwelding electrode adaptor.

Generally speaking, the means and methods of the present invention relate to a resistance welding assembly for the microwelding of electronic modules or the like. A first electrode is coupled electrically to a welding horn. The first electrode terminates in a tip formed by a plane cutting the electrode at an angle with the axis of the electrode which shape permits more accurate positioning of the tip with respect to a workpiece. A second electrode is concentric with the first electrode. The second electrode is slidable with respect to the first electrode and in addition the second electrode terminates in a tip formed by a plane cutting the electrode at an angle with the axis of said electrode, both of which allow more accurate positioning of the electrode on a workpiece and which allows the center of the tip of the first electrode to be positioned substantially closer to the center of the tip of the second electrode. A spring bias means urges the tip of the second electrode to a predetermined vertical position with respect to the tip of the first electrode. The spring bias means serves to establish a predetermined pressure relationship between the tips of the electrodes and a workpiece, eliminating the problems of arcing of the metal and of blemishes in the weld. A means is provided to regulate the pressure relationships between the two electrode faces in a substantially linear fashion to a desired pressure relationship. It is seen that a series weld could be obtained from the apparatus if the pressure exerted by the two electrode faces is equal. The desired pressure relationship is dependent on several various factors such as the size and type of metal desired to be welded.

More particularly the apparatus of the present invention relates to a resistance welding assembly for welding a workpiece having a weld area as small as .002 of an inch by .005 of an inch. A first electrode is coupled to and extends from a welding horn or retaining means at a right angle thereto. The welding horn is coupled to a transformer or other suitable power source. The first electrode terminates in a tip portion having a face diameter of approximately .040 of an inch. It is understood that the weld face can vary in geometrical shape and weld face area to meet the requirements of the particular welding situation. A cylindrical means or interfitting means interfits with the horn in such a manner as to lock the first electrode to the horn when the cylindrical means is located in a first interfitting position and to permit axial positioning in the horizontal direction and in the vertical direction of the first electrode tip when the cylindrical means is in a second interfitting position with the horn. A second electrode is axially interfitting with or concentric with the first electrode. The second electrode is electrically coupled to the electrical ground of a transformer or other power supply by any suitable means. The second electrode is held in the horizontal direction so as to prevent movement in that direction by an electrode support means. The second electrode is axially slidable with respect to the first electrode. Like the first electrode, the second electrode terminates in a tip that has a face that has a diameter of approximately .040 of an inch. As with the first electrode, it is understood that the weld face of the second electrode can vary in geometrical shape and weld face area to meet the requirements of the particular welding situation. A coil spring is positioned within the electrode support means in such a manner so as to bias the tip of the second electrode to a predetermined position with respect to the tip of the first electrode. The spring bias means establishes a predetermined pressure relationship between the tips of the electrodes and a small workpiece so that the welding is accomplished without distorting the small workpiece. Means comprising a bushing and a cooperating locknut positioned on the bushing regulate the predetermined pressure relationship to any particular desired relationship by altering the position of the locknut on the bushing.

Various pressure ranges are realized by using coil compression springs having different compressive values within predetermined pressure ranges.

Referring now to the drawings, which illustrate the preferred embodiment of the present invention, the microwelding apparatus is generally indicated by numeral 10. A first electrode 11 constructed of a small diameter electrically conductive metal is clamped to welding horn 12 fabricated of electrically conductive material. The welding horn is electrically coupled to the source of electrical power of the resistance welding machine (not shown). The horn is utilized to conduct the welding current from the electrical source to first electrode 11 and in addition through its clamping means serves to predeterminately position the first electrode with respect to the workpiece.

Figure 2:
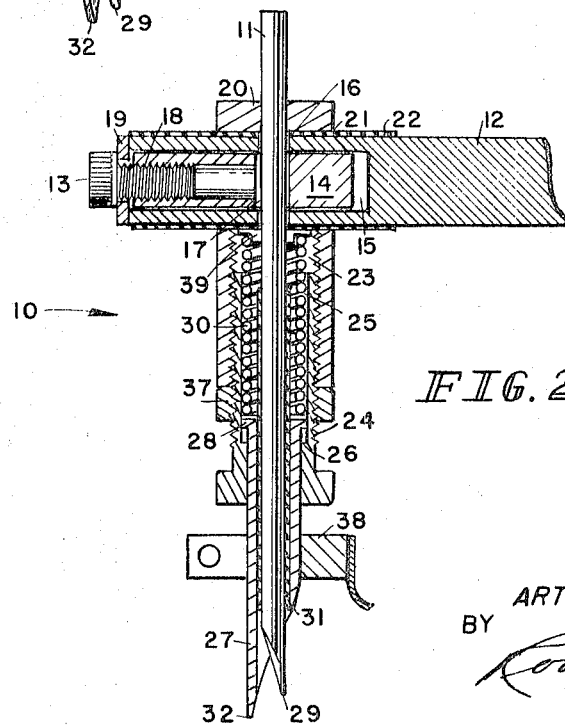
FIGURE 2 is an enlarged cross sectional view of the concentric microwelding electrode adaptor.
Figure 3:
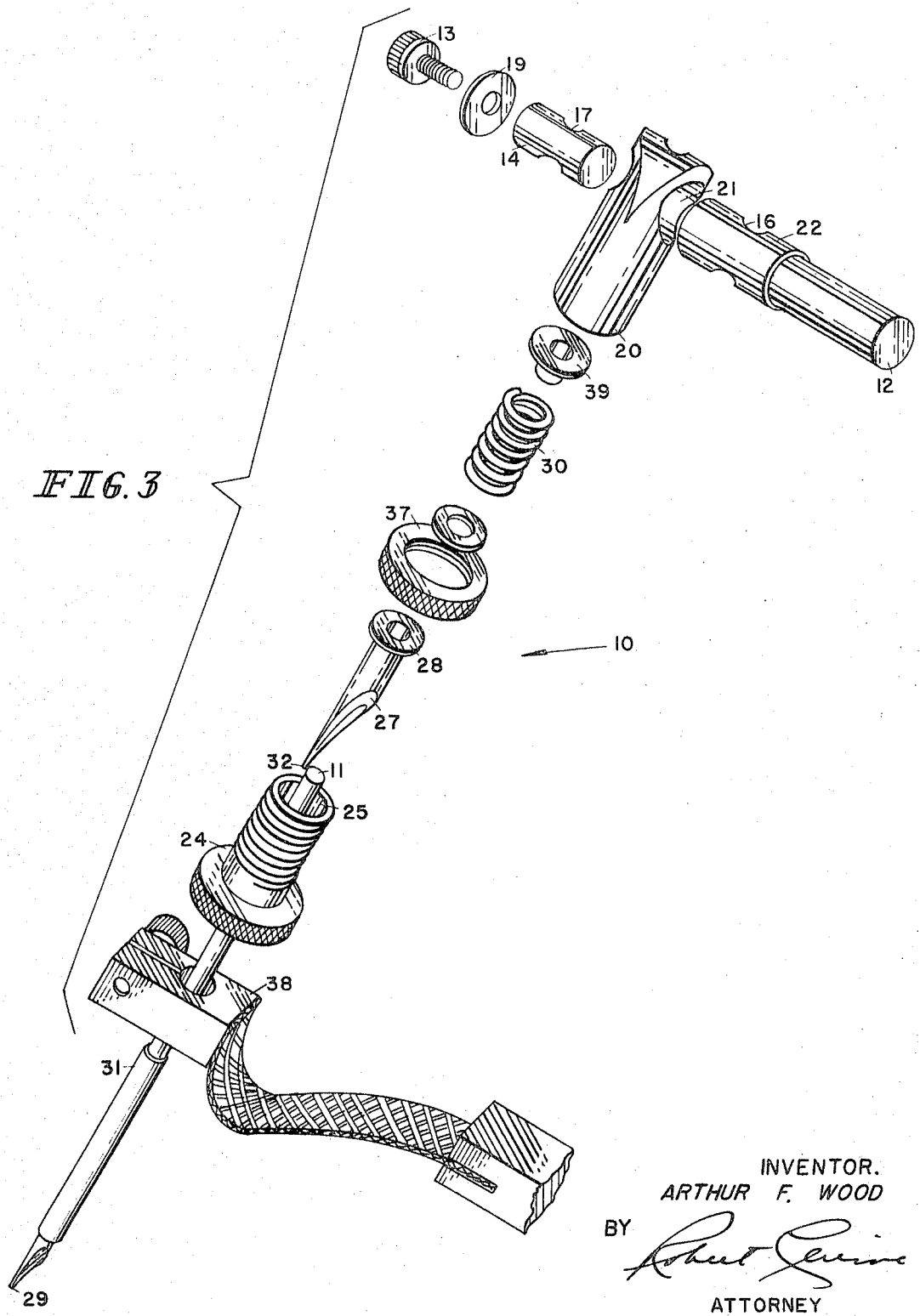
FIGURE 3 is an enlarged perspective view of the present invention illustrating the relative locations of the various components of the concentric microwelding electrode adaptor.

First electrode 11 is clamped to welding horn 12 by means of bolt 13 and cylindrical metal piece 14. The cylindrical metal piece interfits with a recessed cylindrical portion 15 of the horn which extends a predetermined distance along the longitudinal axis of the horn. An aperture 16 of the horn extends crosswise to the horn and passes through the recessed portion of the horn. An aperture 17 of the cylindrical metal piece extends crosswise through the metal piece 14. The metal piece is located in recessed cylindrical portion 15 so as to provide an aperture that is uninterrupted cross wise through the horn when the metal piece is predeterminately positioned within the recess of the horn. First electrode 11 projects through the aperture formed by the combination of aperture 16 of the horn and aperture 17 of metal piece. It is seen the first electrode is perpendicular to and passes through longitudinal axis of both the horn and the metal piece. FIGURE 2 shows a bolt 13 that interfits with a threaded recess portion 18 that extends along the longitudinal axis of the metal piece to the aperture of the metal piece. As bolt 13 is turned into the threaded recess 18, it causes the head of the bolt to contact washer 19 moving the washer in contact with the tip of the horn. Further tuning of the bolt causes metal piece 14 to move toward the head of bolt locking first electrode 11 in position with respect to the horn. It is seen that the electrode can be removed from the horn by backing the bolt out of the threaded aperture releasing the pressure exerted against the first electrode by the cylindrical metal piece thus permitting the first electrode to be removed from or repositioned with respect to the horn.

An electrode holder body 20 has an aperture 21 that extends through the holder and that is perpendicular to the longitudinal axis thereof. Aperture 21 is of sufficient diameter so as to permit the horn to interfit therewith. The points at which the electrode holder would contact the horn are covered by any suitable electric insulation 22 such as Teflon to prevent an electrical current flowing directly from the power supply to the electrode holder body 20. The portion of the longitudinal axis of the electrode holder body that projects downwardly from the horn is hollowed to form an aperture 23. Aperture 23 is threaded to mate with the threaded portion of bushing 24. Extending along the entire longitudinal axis of the threaded bushing is aperture 25. Aperture 25 has a projecting flange portion 26 that serves as a retaining means to prevent downward movement of second electrode 27 beyond a predetermined point with respect to the electrode holder body. Electrode 27 is constructed of a thin, walled tubular section of an electrically conductive metal.

Second electrode 27 is slidably mounted within aperture 25 of bushing 24. The second electrode projects downwardly from aperture 25. Flange 28 projects around the outer periphery of electrode 27 so as to abut with flange 26 of bushing 24 when the electrode is so displaced downwardly thereby preventing a further downward displacement of the second electrode 27. Coupled to the second electrode is grounding means 38.

It is seen from FIGURE 2 that first electrode 11 is concentric with second electrode 27. First electrode 11 projects through the hollow longitudinal axis of second electrode 27. The first electrode is insulated from the second electrode by a suitable insulating coating 31 such as Teflon tubular or a spray Teflon coating of a thickness of less than .001 of an inch.

Figure 7:
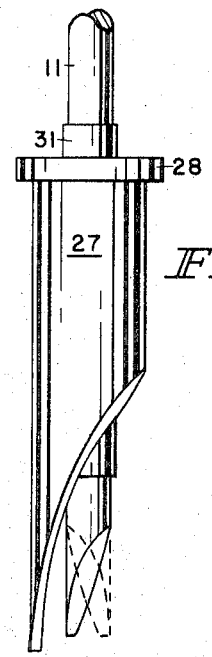
FIGURE 7 is an enlarged side view of the concentric electrodes illustrating the variable positioning characteristics one electrode face has with respect to a second electrode face.
Figure 8:
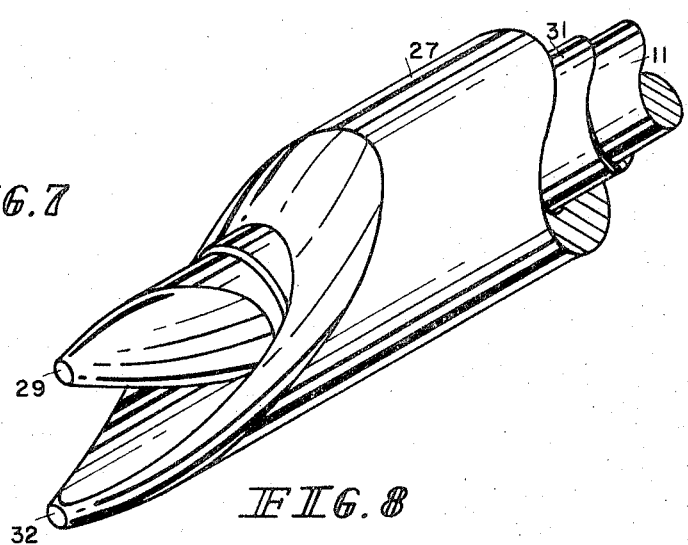
FIGURE 8 is an enlarged perspective view of the concentric electrodes.

FIGURE 7 and FIGURE 8 illustrate the tips of the two electrodes. Electrode 11 and electrode 27 are machined so that the angle of machining with respect to the longitudinal axis of both electrodes is predetermined. A weld face 29 machined on the first electrode is circular in shape. It is understood that the weld face can vary in geometrical shape and that the weld face area is variable to meet the particular requirements of the particular welding situation. A weld face 32 is retained on the second electrode that is circular in shape and has a diameter of substantially .040 of an inch. With the electrodes being separated by less than .001 of an inch of insulation, it is thought that a weld could be made on a work area of .002 inch by .005 inch.

A coil spring 30 lies within aperture 23 and aperture 25 is concentric with the longitudinal axis of the first electrode and bushing 24. The lower extremity of the spring abuts flange 28 of second electrode 27 so that the second electrode slidably positionable in the vertical direction with respect to the substantially fixedly mounted first electrode. The second extremity of the coil spring is retained in place by an insulating seating washer 39 fabricated from any suitable insulation material. Washer 39 abuts horn 12. First electrode 11 projects through the aperture of the washer and traverses the entire length of the longitudinal axis of the coil spring. The thin layer of insulating tubing or spray Teflon 31 extends along the first electrode a sufficient length to insulate the first electrode from the second electrode and the coil spring.

A lock nut 37 interfits with the threaded portion of bushing 24 and abuts the lower extremity of electrode holder 20. It is seen that the interaction between lock nut 37, bushing 24 and the lower extremity of the electrode holder serves to lock the bushing in a predetermined position. The positioning of the bushing will determine the compression force of the spring and the vertical distance through which the second electrode must be displaced before weld face 32 of the second electrode lies in the same horizontal plane as does weld face 29 of first electrode 11. It is seen that a pressure relationship is established when the electrodes make physical contact with the workpiece assuring a weld that does not distort the workpiece to which a material such as a wire is welded.

As disclosed hereinbefore electrode 11 is clamped to horn 12 by turning bolt 13 into threaded recess 18 thereby allowing metal piece 14 to be frictionally coupled to the first electrode and to the aperture 16 of the horn. It is seen that by turning bolt 13 out of the threaded recess that the first electrode is no longer frictionally coupled to aperture 16 of the horn. Electrode 11 is free to be manually rotated within the aperture of the horn, or to have its weld face 29 vertically located with respect to electrode 27 weld face 32. The distance separating the tips of the two electrodes can be varied by merely rotating electrode 11 manually until the desired separation between electrode weld faces is obtained. The weld faces may also be vertically located with respect to each other at the same time. Thereafter bolt 13 is turned into threaded recess 18 thereby frictionally coupling the first electrode to the horn and thereafter fixedly positioning the weld face of the first electrode with respect to the weld face of the second electrode.

Figure 4:
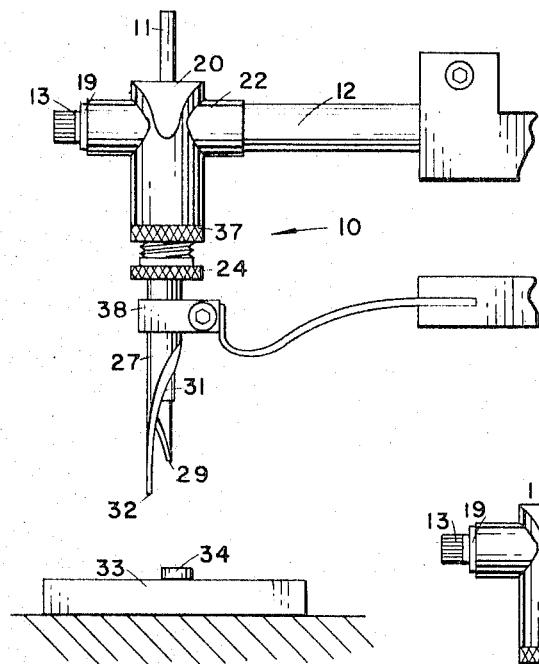
FIGURE 4 is a side view of the microwelding electrode adaptor positioned above a workpiece.

In operation, FIGURE 4 shows the concentric electrodes positioned above workpiece 33 and wire 34 to be welded to the workpiece. The weld faces are predetermined positioned in the horizontal plane and in the vertical plane with respect to each other by manually rotating weld face 29 and vertically moving it to the desired position with respect to weld face 32. The vertical distance separating the two tips is determined by the manual placement of electrode 11 with respect to electrode 27.

Figure 5:
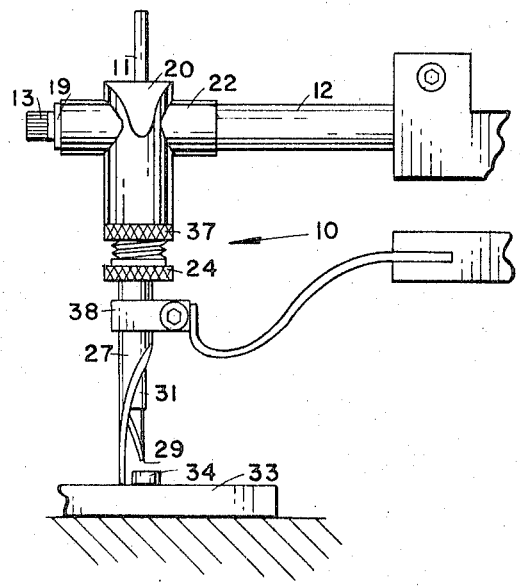
FIGURE 5 is a side view of the microwelding electrode adaptor being positioned with respect to the workpiece.
Figure 6:
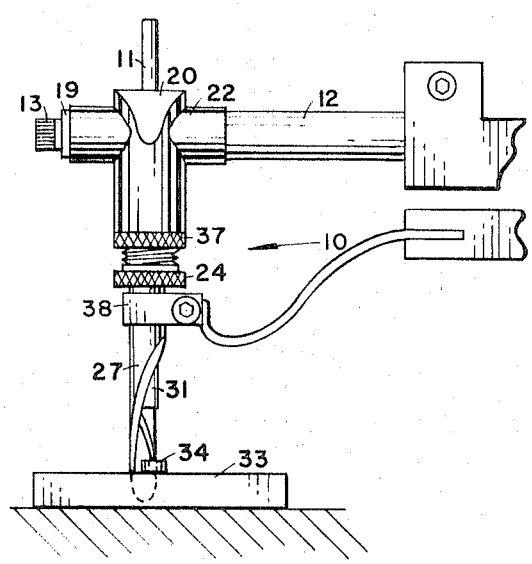
FIGURE 6 is a side view of the microwelding assembly shows the concentric electrodes welding a wire to a thin film metallic substance.

The compression of spring 30 as determined by the position of bushing 24 and the vertical distance separating the electrode weld faces is determinate of the pressure electrode 27 with respect to the workpiece. The electrode force of electrode 11 is determined by the pressure exerted by the welding machine less the force of electrode 27 when both are in contact with the workpiece. FIGURE 5 shows electrode 27 contacting the workpiece 33. FIGURE 6 shows electrode 27 contacting the workpiece 33 and shows electrode 11 contacting wire 34. FIGURE 6 shows a current pulse passing through the wire and the workpiece thereby joining the two metallic pieces by the combination of heat and pressure to produce a localized union through fusion across the intersurface. It is seen by utilizing the hereinbefore described microwelding apparatus with concentric electrodes that welding can be done in an area of .002 inch by .005 inch.

Figure 9:
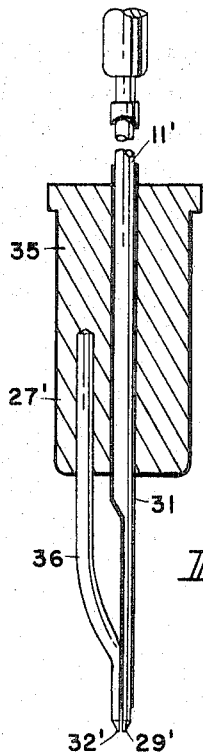
FIGURE 9 is an enlarged cross sectional view of another embodiment of the present invention illustrating details of the electrodes.

The embodiment of FIGURE 9 illustrates features not found in other drawings of the present invention. A first electrode 11' is concentric with the second electrode 27'. First electrode 11' is held and retained by horn 12 and metal piece 14 in substantially the same manner as is first electrode 11. In a like manner first electrode 11' is insulated from second electrode 27' by any suitable insulation 31 such as spray Teflon having thickness of less than .001 of an inch. The weld face 29' of electrode 11' is semicircular in shape whereas weld face 29 of electrode 11 is circular in shape. Second electrode 27' is spring biased as is second electrode 27. Second electrode 27' consists of two parts: a first part 35 that serves as a seat and as a positioner for second part 36. Second part 36 of electrode 27' has a weld face 32' that is semicircular in shape and placed in such a position with respect to weld face 29' that the combination of weld face 29' and weld face 32' is a two electrode weld face that is substantially circular shaped. The pressure relationship between the electrodes and the workpiece is established when the electrodes contact the workpiece for electrode 27' is spring biased in a manner substantially similar to the manner electrode 27 is spring biased. The spring biasing of electrode 27' is variable as is the spring biasing of electrode 27 by repositioning locknut 37 with respect to threaded bushing 24.

Figure 10:
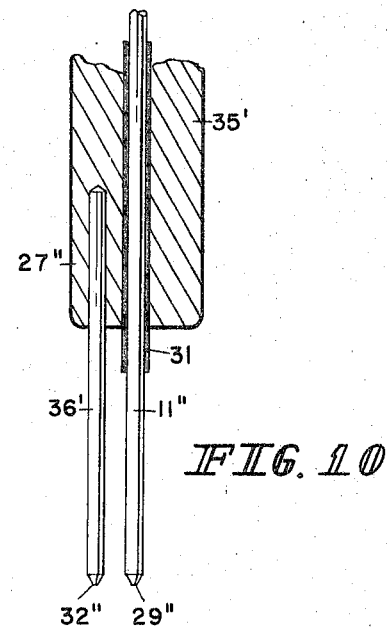
FIGURE 10 is an enlarged cross sectional view of yet another embodiment of the present invention illustrating details of electrodes and the positioning of the electrodes.

In the embodiment of FIGURE 10 certain features are illustrated that are not found in other figures. A first electrode 11" is concentric with a second electrode 27". First electrode 11" is held and retained by horn 12 and metal piece 14 in substantially the same manner as is first electrode 11. In a like manner first electrode 11" is insulated from second electrode 27" by any suitable insulation 31 such as spray Teflon or the like. The weld face 29" of electrode 11" is circular in shape. A second electrode 27" is spring biased in substantially the same fashion as is second electrode 27. It is seen that first electrode 11" is concentric with second electrode 27". The second electrode 27" consists of two parts: a first part 35' that serves as a positioner and as a seat for second part 36'. The weld face 32" of electrode 27" is circular in shape as is weld face 29″ of electrode 11″. The pressure relationship between the electrodes and the workpiece is established when the electrodes contact the workpiece for electrode 27″ is spring biased in substantially the same manner as is electrode 27. The spring biasing of electrode 27″ is variable as is the spring biasing of electrode 27 by repositioning lock nut 37 with respect to threaded bushing 24.

While the invention is illustrated and described in its preferred embodiments, it will be understood that modifications and variations may be effected without departing from the scope of the novel concepts of this invention and as set forth in the appended claims.

Having thus described my invention, I claim:

1. A resistance welding assembly for microwelding of electronic modules or the like comprising: a first electrode extending from a welding horn and terminating in a tip portion, said first electrode electrically coupled to said welding horn, said first electrode held in place by said welding horn and an interfitting means, said interfitting means comprising a cylindrical metal piece, positionable within said horn to frictionally couple said first electrode to said horn when in a first position and when in a second position allowing regulation of the position of said first electrode; a second electrode concentric with said first electrode and held in position in a horizontal direction by an electrode support means, said second electrode being axially slidable with respect to said first electrode and terminating in a tip portion, said second electrode electrically coupled to electrical ground; said tip portions of said first and second electrodes formed by passing a plane through the longitudinal axis of each of said electrodes such that the spacing between said tip portions of said first and second electrodes is varied by rotating said first electrode about its longitudinal axis; means insulating said first and second electrodes from one another; a spring bias means retained within said electrode support means, said spring bias means urging said tip of said second electrode to a predetermined position with respect to said tip of said first electrode, said spring bias means establishing a predetermined pressure relationship between said tips of said electrodes and a workpiece; and means for regulating said predetermined pressure relationship to a desired pressure relationship.

2. A resistance welding assembly for microwelding of electronic modules or the like comprising: a first electrode extending from a welding horn and terminating in a tip portion, said first electrode electrically coupled to said welding horn, said first electrode held in place by said welding horn and an interfitting means, said interfitting means comprising a cylindrical metal piece positionable within said horn to couple said first electrode to said horn when in a first position and when in a second position allowing regulation of the axial position of said first electrode's tip portion, a second electrode concentric with said first electrode and held in position in a horizontal direction by an electrode support means, said second electrode being axially slidable with respect to said first electrode and terminating in a tip portion, said second electrode electrically coupled to electrical ground; said tip portions of said first and second electrodes formed by passing a plane through the longitudinal axis of each of said electrodes such that the spacing between said tip portions of said first and second electrodes is varied by rotating said first electrode about its longitudinal axis; means insulating said first and second electrodes from one another; a spring bias means retained within said electrode support means, said spring bias means urging said tip of said second electrode to a predetermined position with respect to said tip of said first electrode, said spring bias means establishing a predetermined pressure relationship between said tips of said electrodes and a workpiece; and means for regulating said predetermined pressure relationship to a desired pressure relationship.

3. A resistance welding assembly for microwelding of electronic modules or the like comprising: a first electrode extending from a welding horn and terminating in a tip portion, said first electrode held in place by said welding horn and an interfitting means, said interfitting means comprising a cylindrical metal piece positionable within said horn to frictionally couple said first electrode to said horn, when said piece is in a first position, and when said piece is in a second position allowing regulation of the position of said first electrode; a second electrode concentric with said first electrode and held in position in a horizontal direction by an electrode support means, said second electrode being axially slidable with respect to said first electrode and terminating in a tip portion, said second electrode electrically coupled to electrical ground; said tip portions of said first and second electrodes formed by passing a plane through the longitudinal axis of each of said electrodes such that the spacing between said tip portions of said first and second electrodes is varied by rotating said first electrode about its longitudinal axis; means insulating said first and second electrodes from one another; a spring bias means retained within said electrode support means, said spring bias means urging said tip of said second electrode to a predetermined vertical position with respect to said tip of said first electrode, said spring bias means establishing predetermined pressure relationship between said tips of said electrodes and a workpiece so that welding is accomplished without distorting said workpiece; and means comprising a bushing and a cooperating locknut positioned on the bushing for regulating said predetermined pressure relationship to a desired pressure relationship by altering said position of said locknut on said bushing.

4. A welding assembly comprising welding horn means, first electrode means terminating in a weld face electrically connected to said welding horn means, support means carried by said welding horn means adjacent said first electrode, said support means biasing said first electrode against said welding horn means when in a first position thereby fixedly retaining said first electrode and when in a second position allowing alteration of the position of said first electrode, an axially apertured second electrode terminating in a weld face connected to electrical ground, said second electrode slidably inter-fitting with said first electrode, said weld faces of said first and second electrodes formed by passing a plane through the longitudinal axis of each of said electrodes such that the spacing between said weld faces of the first and second electrodes is varied by displacing said first electrode with regard to said second electrode, said support means adjacent said second electrode supporting said second electrode, and insulating means insulating said first electrode from said second electrode.

5. A welding assembly comprising welding horn means, first electrode means terminating in a weld face electrically connected to said welding horn means, support means carried by said welding horn means adjacent said first electrode, said support means biasing said first electrode against said welding horn means when in a first position thereby fixedly retaining said first electrode and when in a second position allowing alteration of the position of said first electrode, an axially apertured second electrode terminating in a weld face connected to electrical ground, said second electrode slidably inter-fitting with said first electrode, said weld faces of said first and second electrodes formed by passing a plane through the longitudinal axis of each of said electrodes such that the spacing between said weld faces of the first and second electrodes is varied by rotating said first electrode about its longitudinal axis, said support means adjacent said second electrode supporting said second electrode, and insulating means insulating said first electrode from said second electrode.

6. A welding assembly comprising welding horn means, first electrode means terminating in a weld face electrically connected to said welding horn means, support means carried by said welding horn means adjacent said first electrode, said support means biasing said first electrode against said welding horn means when in a first position thereby fixedly retaining said first electrode and when in a second position allowing alteration of the position of said first electrode, an axially apertured second electrode terminating in a weld face connected to electrical ground, said second electrode slidably inter-fitting with said first electrode, said weld faces of said first and second electrodes formed by passing a plane through the longitudinal axis of each of said electrodes such that the spacing between said weld faces of the first and second electrodes is varied by displacing said first electrode with regard to said second electrode, said support means adjacent said second electrode supporting said second electrode, insulating means insulating said first electrode from said second electrode, and bias means carried by said electrode support means urging said weld face of said second electrode to a predetermined position with respect to said weld face of said first electrode and establishing a pressure relationship between said weld faces and a workpiece.

7. A welding assembly comprising welding horn means, first electrode means terminating in a weld face electrically connected to said welding horn means, support means carried by said welding horn means adjacent said first electrode, said support means biasing said first electrode against said welding horn means when in a first position thereby fixedly retaining said first electrode and when in a second position allowing alteration of the position of said first electrode, an axially apertured second electrode terminating in a weld face connected to electrical ground, said second electrode slidably inter-fitting with said first electrode, said weld faces of said first and second electrodes formed by passing a plane through the longitudinal axis of each of said electrodes such that the spacing between said weld faces of the first and second electrodes is varied by displacing said first electrode with regard to said second electrode, said support means adjacent said second electrode supporting said second electrode, insulating means insulating said first electrode from said second electrode, bias means carried by said support means urging said weld face of said second electrode to a predetermined position with respect to said weld face of said first electrode and establishing a pressure relationship between said weld faces and a workpiece, and means for regulating said pressure relationship to a desired pressure relationship carried by said support means.

8. A welding assembly comprising welding horn means, first electrode means terminating in a weld face electrically connected to said welding horn means, support means carried by said welding horn means adjacent said first electrode, said support means biasing said first electrode against said welding horn means when in a first position thereby fixedly retaining said first electrode and when in a second position allowing alteration of the position of said first electrode, an axially apertured second electrode terminating in a weld face connected to electrical ground, said second electrode slidably inter-fitting with said first electrode, said weld faces of said first and second electrodes formed by passing a plane through the longitudinal axis of each of said electrodes such that the spacing between said weld faces of the first and second electrodes is varied by rotating said first electrode about its longitudinal axis, said support means adjacent said second electrode supporting said second electrode, insulating means insulating said first electrode from said second electrode, bias means carried by said support means urging said weld face of said second electrode to a predetermined position with respect to said weld face of said first electrode and establishing a pressure relationship between said weld faces and a workpiece, and means for regulating said pressure relationship to a desired pressure relationship carried by said support means.

9. A welding assembly comprising welding horn means, first electrode means terminating in a weld face electrically connected to said welding horn means, support means carried by said welding horn means adjacent said first electrode, said support means biasing said first electrode against said welding horn means when in a first position thereby fixedly retaining said first electrode and when in a second position allowing alteration of the position of said first electrode, an axially apertured second electrode terminating in a weld face connected to electrical ground and concentric with said first electrode, said weld faces of said first and second electrodes formed by passing a plane through the longitudinal axis of each of said electrodes such that the spacing between said weld faces of the first and second electrodes is varied by rotating said first electrode about its longitudinal axis, said support means adjacent said second electrode supporting said second electrode, said second electrode slidable with respect to said first electrode, insulating means insulating said first electrode from said second electrode, spring bias means carried by said support means, said spring bias means urging said weld face of said second electrode to a predetermined position with respect to said weld face of said first electrode, said spring bias means establishing a pressure relationship between said weld faces and a workpiece, and means for regulating said pressure relationship to a desired pressure relationship carried by said support means.

10. A welding assembly comprising welding horn means, first electrode means terminating in a weld face electrically connected to said welding horn means, support means carried by said welding horn means adjacent said first electrode, said support means including cylindrical means biasing said first electrode so as to frictionally engage said first electrode with said welding horn means when in a first position thereby fixedly retaining said first electrode and when in a second position allowing alteration of the position of said first electrode, an axially apertured second electrode terminating in a weld face connected to electrical ground and concentric with said first electrode, said weld faces of said first and second electrodes formed by passing a plane through the longitudinal axis of each of said electrodes such that the spacing between said weld faces of the first and second electrodes is varied by rotating said first electrode about its longitudinal axis, said support means adjacent said second electrode supporting said second electrode, said second electrode axially slidable with respect to said first electrode, insulating means insulating said first electrode from said second electrode, spring bias means carried by said support means, said spring bias means urging said weld face of said second electrode to a predetermined position with respect to said weld face of said first electrode, said spring bias means establishing a pressure relationship between said weld faces and a workpiece, and means for regulating said pressure relationship to a desired pressure relationship carried by said support means.

11. A resistance welding assembly for microwelding a workpiece having an area of about .002 inch by .005 inch comprising welding horn means, first electrode means terminating in a weld face electrically connected to said welding horn means, support means carried by said welding horn means adjacent said first electrode, said support means including cylindrical means biasing said first electrode so as to frictionally engage said first electrode with said welding horn means when in a first position thereby fixedly retaining said first electrode and when in a second position allowing alteration of the position of said first electrode, an axially apertured second electrode terminating in a weld face connected to electrical ground and concentric with said first electrode, said weld faces of said first and second electrodes having a diameter of about .040 inch and formed by passing a plane through the longitudinal axis of each of said electrodes such that the spacing between said weld faces of the first and second electrodes is varied by rotating said first electrode about its longitudinal axis, said support means adjacent said second electrodes supporting said second electrode, said second electrode axially slidable with respect to said first electrode, insulating means insulating said first electrode from said second electrode, spring bias means carried by said support means, said spring bias means urging said weld face of said second electrode to a predetermined position with respect to said weld face of said first electrode, said spring bias means establishing a pressure relationship between said weld faces and a workpiece having an area of about .002 inch by .005 inch, and means for regulating said pressure relationship to a desired pressure relationship carried by said support means.

12. A resistance welding assembly for microwelding a workpiece having an area of about .002 inch by .005 inch comprising welding horn means, first electrode means terminating in a weld face electrically connected to said welding horn means, support means carried by said welding horn means adjacent said first electrode, said support means including cylindrical means biasing said first electrode so as to frictionally engage said first electrode with said welding horn means when in a first position thereby fixedly retaining said first electrode and when in a second position allowing alteration of the position of said first electrode, and axially apertured second electrode terminating in a weld face connected to electrical ground and concentric with said first electrode, said weld faces of said first and second electrodes having a diameter of about .040 inch and formed by passing a plane through the longitudinal axis of each of said electrodes such that the spacing between said weld faces of the first and second electrodes is varied by rotating said first electrodes about its longitudinal axis, said support means adjacent said second electrode supporting said second electrode, said second electrode axially slidable with respect to said first electrode, insulating means insulating said first electrode from said second electrode, coil spring bias means carried by said support means so that said first electrode projects therethrough, said coil spring bias means urging said weld face of said second electrode to a predetermined position with respect to said weld face of said first electrode, said coil spring bias means establishing a pressure relationship between said weld faces and a workpiece having an area of about .002 inch by .005 inch, and means for regulating said pressure relationship to a desired pressure relationship carried by said support means.

References Cited
UNITED STATES PATENTS

| | | | |
|---|---|---|---|
| 2,045,523 | 6/1936 | Fassler | 219—86 |
| 2,109,461 | 3/1938 | Brown | 219—120 |
| 2,797,303 | 6/1957 | Kershaw | 219—78 |
| 3,036,198 | 5/1962 | Grimland et al. | 219—78 |
| 3,089,947 | 5/1963 | Frungel | 219—107 |
| 3,100,832 | 8/1963 | Sosoka et al. | 219—86 |
| 3,234,354 | 2/1966 | Penberg | 219—86 |
| 3,263,057 | 7/1966 | Conti | 219—78 |

RICHARD M. WOOD, *Primary Examiner.*

W. D. BROOKS, *Assistant Examiner.*